(12) United States Patent
Chandak et al.

(10) Patent No.: US 11,151,624 B1
(45) Date of Patent: Oct. 19, 2021

(54) COLLABORATIVE GIFT GUIDANCE AND SELECTION

(71) Applicant: Amazon Technologies, Inc., Seattle, WA (US)

(72) Inventors: Mohit Chandak, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 16/123,624

(22) Filed: Sep. 6, 2018

(51) Int. Cl.
   G06Q 30/00 (2012.01)
   G06Q 30/06 (2012.01)
   G06Q 20/22 (2012.01)

(52) U.S. Cl.
   CPC ......... *G06Q 30/0605* (2013.01); *G06Q 20/29* (2013.01); *G06Q 30/0635* (2013.01); *G06Q 30/0641* (2013.01)

(58) Field of Classification Search
   CPC .................................. G06Q 30/0601–0645
   See application file for complete search history.

(56) References Cited

U.S. PATENT DOCUMENTS

| | | | |
|---|---|---|---|
| 2016/0019630 A1* | 1/2016 | Vippagunta | G06Q 30/0631 705/26.8 |
| 2016/0055571 A1* | 2/2016 | Wouhaybi | G06F 16/9535 705/12 |
| 2019/0156400 A1* | 5/2019 | Dhapola | G06Q 30/0609 |

OTHER PUBLICATIONS

Hibino, 'Semantics Meets UX: Mediating Intelligent Indexing of Consumers' Multimedia Collections for Multifaceted Visualization and Media Creation', Tenth IEEE International Symposium on Multimedia, 2008 (Year: 2008).*

* cited by examiner

*Primary Examiner* — Marissa Thein
*Assistant Examiner* — Maria S. P. Heath
(74) *Attorney, Agent, or Firm* — Lee & Hayes, P.C.

(57) ABSTRACT

A system generates a first gift selection matrix that includes a first set of items of interest to a recipient organized in columns of increasing cost and rows of decreasing interest to the recipient. The system transmits the first gift selection matrix to a first user computing device and to a second user computing device. Item selections are received from users, along with gift purchase contribution pledges. If the pledges are insufficient to cover a cost of one of the selected items, the system sends a request to the first user and the second user for either an a second gift selection, or a pledge of additional funds. If the new gift selections are not the same, or if the pledged amounts are insufficient to purchase a selected gift, the system generates a second gift selection matrix. The system transmits the second gift selection matrix to the first user computing device and the second user computing device. A final gift selection can be made from the second matrix.

20 Claims, 12 Drawing Sheets

US 11,151,624 B1

COLLABORATIVE GIFT GUIDANCE AND SELECTION

BACKGROUND

Choosing gifts for a friend or family member is often a tedious and uncertain process. One must decide what would make a great gift, something that the recipient will like and enjoy, within a certain price range. This process of identifying possible gifts that the recipient would like and deciding on a particular gift becomes more involved and complex when a group of people are interested in buying a gift for one person. The complexity arises from the fact that different people have disparate ideas on what that ideal gift could be, and the cost of the gift when multiple people are contributing varying sums of money.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
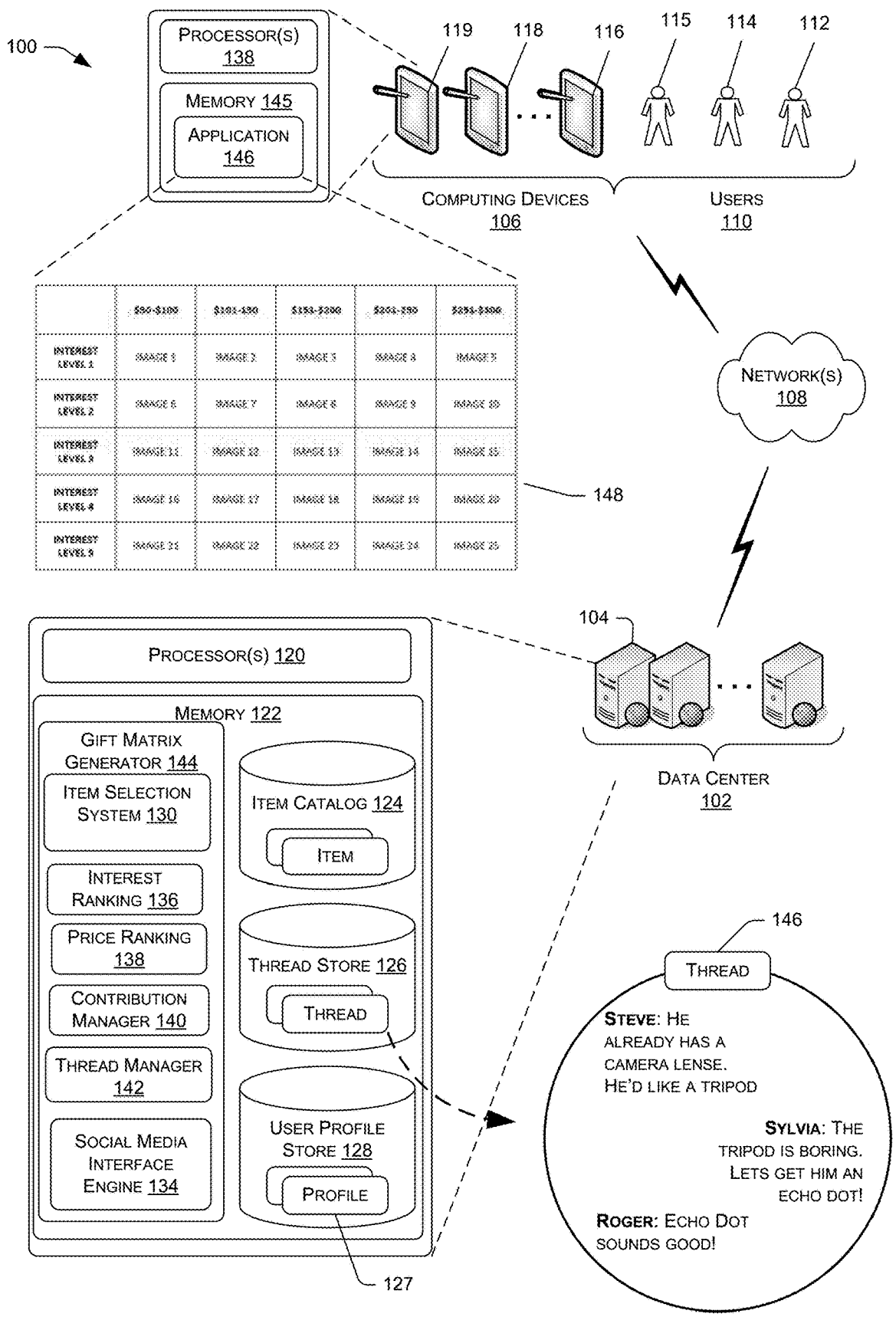
FIG. 1 is a schematic diagram of an illustrative environment that includes services and systems to provide a collaborative gift purchase guidance and selection, according to example embodiments of the disclosure.

Retailers often have a massive inventory of items for sale and, in some instances, implement recommendation systems that identify, on a customer-by-customer basis, which items are most likely to be desirable to a particular customer. For example, current recommendation systems may provide numeric indicators of an item's interest to a user based on one or more wish lists of the customer, self-selection of the items by the customer, gift ideas from affiliates or associates saved in gift registries, browsing and click histories, etc. While recommendation systems have intuitive information that identifies products of interest to the consumer, friends of the consumer may not have access to this information and cannot necessarily know what would make an appropriate gift for a customer/gift recipient based on his or her current interests and preferences.

The gift selection process becomes even more challenging when it is done collectively by a group of the gift recipient's friends and colleagues. For example, the issue of collecting gift money may become awkward when the gift givers live in different locations, and have different means from which they can offer a gift contribution (that is, they may not all be disposed to give the same amount of money for a group gift). Since each of the gift givers may know the recipient in a different way, they may have very different ideas on what type of gift would be most appreciated by the recipient.

Given the above, it may be advantageous to provide a system for collaborative gift selection using, for example, a two-dimensional matrix of pre-generated gift ideas that are customized according to known or selected preferences of the recipient. By pictorially organizing the gift ideas on the matrix according to predicted interest and by price, the gift selection matrix can provide an intuitive and fun way to collaboratively select the best possible gift given a budget. In addition, the gift selection matrix may represent a central location where a group of gift givers may collaborate with one another in the gift selection process.

In one embodiment, a customer who invites or selects a group of users to an event publishes her gift matrix for gift ideas. The customer may or may not explicitly choose those users; she may select to publish or broadcast her gift matrix to everyone interested in her social network, for example. Each invitee or recipient of the gift matrix can select the price ranges and items that they think would make a great gift for the customer. The invitees then individually pledge an amount as a contribution to those items as gifts.

For example, an example system, such as a gift selection system discussed below with reference to FIG. 1, may determine that there is an intent to create a group gift selection using the gift matrix. The system may determine the intent automatically based on an evaluation of item selection using the online store on the system, based on browsing history using the system, user calendar information that is shared with the system, or in another way such as a discrete user input indicating intent to create the gift matrix. As another example, a current customer-user may be planning a baby shower, and may therefore elect to self-publish a gift matrix for the baby shower. In yet another example, the parent of a teenager may be planning a graduation party for the teenage gift recipient, and chooses to create and publish the gift matrix to a set group of family and friends. In another embodiment, the system evaluates, based on a calendar entry indicative of a spouse's birthday, that the gift recipient's husband may want to create a gift matrix and publish the matrix to select family members in advance of the birthday date.

Once the system determines that there is an intent to create a group gift selection, the system may create the gift selection matrix that includes a set of items known by the system, as described previously, to be desirable to the gift recipient. The system constructs the gift selection matrix from a list of ranked items at price ranges (or brackets) such as, for example, $0-$50, $51-100, $101-$150, etc. While these given ranges provide brackets of $50, other ranges are contemplated and may be selected by the customer.

In an embodiment, the system transmits the first gift selection matrix to a group of users. A customer who invites or selects a group of users to an event publishes his/her gift matrix for gift ideas. The customer sending the gift matrix may or may not explicitly choose those users. For example, in an embodiment, he or she may select to publish or broadcast her gift matrix to everyone interested in his/her social network. In another example, the group is automatically selected based on known profile information for the customer.

The person receiving the gift (the gift recipient) may be involved in different ways. In one aspect, the gift recipient may be the party that initiates creation and distribution of a gift matrix, where the gift recipient selects the invitees (the group of users) to whom the gift selection matrix will be published. In other aspects, the gift recipient may be excluded from the process because the gift is meant to be a surprise. In the surprise gift example, the system may be notified of the identity of the gift recipient, and may be aware of the recipient's preferences (e.g., the relative interest of the gift recipient with respect to various gift selection ideas). In other aspects, the gift recipient may be unaware of the final selection of the gift, but may be notified only that a gift matrix has been initiated. In another aspect, the gift recipient may merely be involved to select the members of the group to whom the gift matrix is to be published. Other scenarios are contemplated, and thus, should not be limited by those discussed herein.

In an embodiment, the system sends an indication of the gift selection matrix to a first user and a second user (where both users are part of a group of people that may be interested in selecting a gift for the gift recipient). Accordingly, the first and second users both receive, at their respective client devices, a notification that a gift matrix has been prepared, and that they are invited to participate in selecting and purchasing a gift with the group. Each invitee or recipient of the gift matrix can select the price ranges and items that he or she thinks would make a great gift for the customer. After selecting, the user then pledges an amount of money as a contribution to purchase to those items as gifts. For example, a participant may select a gift costing $150 as a suggested gift for purchase by the group. The participant may also pledge an amount of $40 in contribution toward that gift. The other participants may make their respective selections using their own devices, and provide contribution pledges toward the final gift selection. After all of the participants (e.g., the recipients of the gift matrix that are invited to collaborate on the gift purchase) have selected a gift idea and provided a pledge indicating their gift contribution amount, the first round is complete.

Based on this input, the system receives the item selections from the participants. For example, the system may receive a first user item selection from the first gift selection matrix, and a first pledge indicative of a first gift purchase amount. The system also may receive, from the second user computing device, a second user item selection from the first gift selection matrix and a second pledge indicative of a second gift purchase contribution amount. In one embodiment, each of the participants may have selected the same gift from the gift matrix, and the sum of the pledged amount from all participants is large enough to purchase that gift. In that example, the system may collect the pledged funds from each of the participants, and complete the purchase of the selected gift.

In another example, the participants may have selected different gifts from the suggested gifts in the gift matrix. Accordingly, the system may evaluate whether the sum of the contribution pledges is sufficient to purchase at least one of the selected gifts on the gift matrix. Considering only two participants as an example, responsive to determining that a sum of the first pledge and the second pledge is insufficient to purchase one of the first user item selection and the second user item selection, the system may transmit a request for further input from the participants. The request may present a selectable choice to each of the participants to either 1) increase their respective pledge, or 2) request that the system create a second gift selection matrix having a lower cost limit, which makes the gift purchasable given the pledged amount of funds from the group of participants.

In an embodiment, when some or all group participants elect to contribute more as a pledge, the system may evaluate whether the new pledges are sufficient to cover the cost of one of the selected items. If the new amount is sufficient for at least one purchase, the system may generate a new gift matrix and publish the matrix to the participants. The next round gift matrix may include the previously selected items, plus similar items to the selected items that the system predicts would be of interest to the gift recipient based on known correlations between the gift recipient and particular items and/or categories of items. As an example, the system includes a user profile store having user profile information for the gift recipient. In the user profile, the gift matrix generator may observe and note items (using an item selection engine such as, for example, an item selection system or other user/item matching system known in the art) in which the gift recipient has a particular interest. The system determines the predicted interest of an item or category of items to the gift recipient by the gift recipient's previous browsing history, prior purchase history, clicking behavior, time lingering on a particular page, etc. These points of data are stored by the system in the gift recipient's user profile, and referenced in determining whether a gift will be of particular interest to the gift recipient. Once an interest value is generated for an item known to be of a particular interest to the gift recipient, the value is assigned to the gift matrix item, and that item is populated to a corresponding square of the gift matrix. The next round gift matrix may be populated with these additional items, which are now organized in corresponding price and relative interest to the recipient. The newly-added items that are contiguous to the first-round selected items may be especially relevant as ideal gift selections. For example, on the gift matrix, since the items are organized in columns of increasing cost, and in rows of decreasing predicted interest, any unselected items that are contiguous to the selected gift items may be ideal candidate items for addition to the second-round gift matrix because they are similar in cost and interest.

Moreover, the system has more exact information as to the budget for the gift purchase, because pledged contribution amounts have been submitted and, in some instances, updated with higher amounts. Accordingly, the system may re-calibrate the second-round gift matrix to include, as a maximum limit, gifts having a cost equal to the sum of all of the pledged contributions. The system then creates a new gift matrix, with re-calibrated item cost columns, and populates the gift matrix with the previously (in the first-round) selected items. The previously selected items are placed at the appropriate column and row according to price and predicted interest. The system further populates the second-round gift matrix with the items of interest that were not selected but clustered around the selected gifts. Each of the other gift selections from the first-round gift matrix may be removed, leaving open cells in the matrix for the addition of new gift ideas.

In one embodiment, the participants may provide a suggestion for a gift idea. The suggestion is evaluated by the system to determine a predicted interest rating, and the suggested gift idea is added to the gift matrix in the corresponding row and column according to its price and relative predicted interest. Although described during the second-round selection process, it is contemplated that a participant-initiated gift idea may be presented for the group at any time during the gift selecting process, including the first round selection process.

In some instances, the system receives the second-round gift selections from the participants (e.g., the first user and the second user), as well as second respective pledges from the participants. If each of the participants has selected the same gift from the gift matrix, and the contribution amount is at least as much as the cost of the agreed-upon selection, then purchase of the selected gift is initiated. In other cases where the participants may have not yet agreed on the same gift, the gift selection process continues to aid in selection of one or more appropriate gifts agreed upon by one or more of the participants. If the system determines that a sum of the first pledge and the second pledge is greater than the cost of an item selection, the system may reduce the first pledge and the second pledge by a proportional amount equal to a difference between the sum of the first pledge and the second pledge and the cost of the item selection.

In an embodiment, when the second-round selections include different items, the system may create another gift matrix that includes fewer items, having, for example, only the cluster of items surrounding the current picks. In one aspect, the participants may communicate on a chat thread to discuss the gift selection. For example, one participant may advocate for selection of a camera lens because she knows the recipient is an avid photographer. Another user, that knows the recipient's vast collection of camera lenses, may comment that he already has three, but another gift may be a better gift.

In one aspect, the system may publish several rounds of gift matrices until consensus is reached as to the optimal gift that balances the available funds for purchase (embodied as gift pledges) with recommendations from those that are familiar with the gift recipient, and further balanced with known purchase/interest preferences of the gift recipient. In another aspect, the system may publish a predetermined number of rounds as selected by the originating gift participant that elected to create the first gift matrix. In yet another aspect, the rounds of publish and selection may continue until a predetermined date.

In another aspect, the system may present a voting feature, where the participants vote on the two final selections from the group, and where the item receiving the greatest number of votes wins as the final gift selection. In one embodiment, when no consensus is reached as to a selected gift, the system may direct each of the contribution pledge funds to a gift card to be sent to the gift recipient.

Turning now to FIG. 1, a schematic diagram of an illustrative computing environment 100 is shown that includes services and systems that provide collaborative gift purchase guidance and selection, according to example embodiments of the disclosure. The computing environment 100 includes a data center 102, including a gift matrix system 104. The data center 102 is in communication with a plurality of computing devices 106 via one or more networks 108. The computing devices 106 may be operated by one or more users 110. For example, a first user 112, a second user 114, and a third user 115 may operate respective one or more computing devices 106. As an example, the first user 112 may operate a first user computing device 116, the second user 114 may operate a second user computing device 118, and a third user 115 may operate a third user computing device 119.

The gift matrix system 104 may include one or more processors 120, and a non-transitory computer-readable memory 122. The memory 122 can include one or more memory stores such as, for example, an item catalog 124, a thread store 126, and a user profile store 128.

The memory 122 also includes a gift matrix generator 144. The gift matrix generator 144 may include a item selection system 130, an interest ranking module 136, a contribution manager 140, a thread manager 142, and a social media interface engine 123.

The gift matrix generator 132 may be separate from the item selection system 130, where the gift matrix generator 132 accesses the item selection system 130 by sending and receiving user profile 127 information from the user profile store 128 to obtain item interest information for a particular gift recipient. In other aspects, the item selection system may be functionally part of the gift matrix generator 144. The item selection system 130, as known in the art of e-commerce, provides personalized recommendations to users of an e-commerce store based on many avenues of available consumer behavior information. For example, click history, purchase history, search engine search term information, site visitation frequency, click frequency, click speed, time spent looking at a particular product, products purchased together, and many other aspects, may be used to inform user purchase interests.

In one aspect, the item selection system 130 associates user history with predicted interest for a particular item. The user profile store 128 may store user profile information, including, for example, item interest information, user history, etc. For example, there are known methods for recommending items to users without requiring the users to explicitly rate items or create lists of their favorite items. The personal recommendations are generated using item relatedness data, which may be stored in the product catalog data store 124. The recommendations may be determined using the above-mentioned methods, but may be generated using other sources or types of item relatedness data (e.g., item relationships determined using a content-based analysis). In one example, the personalized recommendations are based on the products or other items viewed by the customer during a current browsing session, and thus tend to be highly relevant to the user's current shopping or browsing purpose.

In another example, there are known methods for identifying items that are related to one another. For example, user actions that evidence users' interests in, or affinities for, particular items can be recorded in the user profile store 128 for subsequent analysis. These item-affinity-evidencing actions may include, for example, the purchase of an item, the viewing of an item's detail page, and/or the addition of an item to an online shopping cart. To identify items that are related or "similar" to one another, the processor 120 may access an off-line table generation component to analyze the histories of item-affinity-evidencing actions of users (preferably on a periodic basis) to identify correlations between items for which such actions were performed. In one example, user-specific purchase histories stored in the user profile store 128 are analyzed to identify correlations between item purchases (e.g., products A and B are similar because a significant number of those who bought A also bought B).

In one embodiment, product viewing histories of users are recorded and analyzed to identify items that tend to be viewed in combination (e.g., products A and B are similar because a significant number of those who viewed A also viewed B during the same browsing session). This may be accomplished, for example, by maintaining user-specific (and preferably session-specific) histories of item detail pages viewed by the users. An important benefit to using product viewing histories is that relationships can be determined between items for which little or no purchase history data exists (e.g., an obscure product or a newly-released product). Another benefit to using viewing histories is that the item relationships identified include relationships between items that are pure substitutes for each other. This is in contrast to purely purchase based relationships, which are typically exclusively between items that are complements of one another (tend to be bought in combination). Product viewing histories may be stored as part of a user profile 127, and may be stored in the user profile store 128.

The results of the above process are preferably stored in a table that maps items to sets of similar items. For instance, for each reference item, the table may store a list of the N items deemed most closely related to the reference item. The table also preferably stores, for each pair of items, a value indicating the predicted degree of relatedness between the two items. The table is preferably generated periodically using a most recent set of purchase history data, product viewing history data, and/or other types of historical browsing data reflecting users' item interests.

The gift matrix generator 132 includes an interest ranking module 136, a price ranking module 138, and a contribution manager 140. The item selection system 130 may also include a social media interface engine 134. In some aspects, the gift matrix generator 132 may reference a table that maps items to sets of similar items, in order to populate the gift selection matrix. For example, a gift selection matrix 148 may include columns indicating divisions or brackets of item costs, and rows indicating different interest levels of a product.

The interest ranking module 136 may be configured to evaluate an item with respect to its probable interest to a gift recipient. The gift recipient, who is a user of the data center shopping service, informs the interest ranking system 136 over time by regular interaction with the system. For example, as known in the art, the item selection system 130 may determine a probable interest of an item to a particular user based on information gathered from lists, shopping behavior, purchase history, shopping cart activity, etc.

The price ranking module 138 may be configured to rank items in a gift matrix according to their purchase cost. In one aspect, the price ranking module 138 may be configured to evaluate cost brackets based on available funds, which may be ascertainable by contribution pledges made by the users of the gift matrix generator 132. The price ranking module 138 is responsible for placing respective products in a corresponding column of the matrix according to price.

The contribution manager 140 is configured to coordinate respective forms of payment offered by the gift matrix users 110, evaluate contribution amounts with respect to item cost, and to perform transaction purchases using payment devices associated with user 110 accounts. For example, the contribution manger 140 may collect payment information from gift matrix participants that are collaborating on a gift purchase such that, after a gift is selected and finalized, the contribution manager 140 transfers funds from stored payment vehicles associated with the participants. Once a purchase is initiated, the contribution manager may fund the purchase using the collected funds.

The gift matrix system 104 is also configured to facilitate interactions between participants (e.g., the users 110) as they collaborate about purchasing the gift. For example, the thread manager 142 may allocate system memory 122 to operate a chat thread 146. In the chat thread 146, a sample dialogue is shown between fictional users named Steve, Sylvia, and Roger. Although only three chat members are depicted, it is contemplated that any number of participants may be users that collaborate in a single thread. As an example, the chat thread may be configured as a live chat client, a video chat client, or another vehicle of communication. For example, the thread 146 may allow any number of gift collaborators to communicate using voice, screen sharing, video, texting, photo sharing, link sharing, or other forms of communication. The thread store 126 may store information including current and prior chat threads that are related to gift matrix users 110.

The memory 122 includes datastores including, for example, the item catalogue 124. The item catalogue 124 may store the online store's current product offering. The item catalogue 124 can provide metadata for generating images and for providing other product information. In one example, the processor 120 may determine that a particular product (a smart speaker for example) is particularly interesting to a gift recipient using profile information stored in the user profile store 128. The processor 120 may access the item catalogue 124 to retrieve metadata associated with the product including product cost information, an image of the product, product rating information, product availability information, etc. The processor 120 may also retrieve a predicted interest score for the product. Using the cost information and the predicted interest information, the processor 120 may assign the metadata to a particular cell of the gift selection matrix such that the image of the product is displayed at a corresponding grid location according to interest score and cost. In some aspects, the image may be clickable by a user computing device such that the metadata associated with the image brings up a product page from the product catalog 124.

The user computing devices 106 may include one or more processors 120, and a computer-readable memory 145. The memory 145 may include an application 142 for receiving a gift selection matrix 148 from the data center 102. For example, the processor 120 may receive the gift selection matrix 148, receive inputs from the user 114 operating the computing device, and communicate the inputs to the data center 102 via the network 108.

Figure 2:
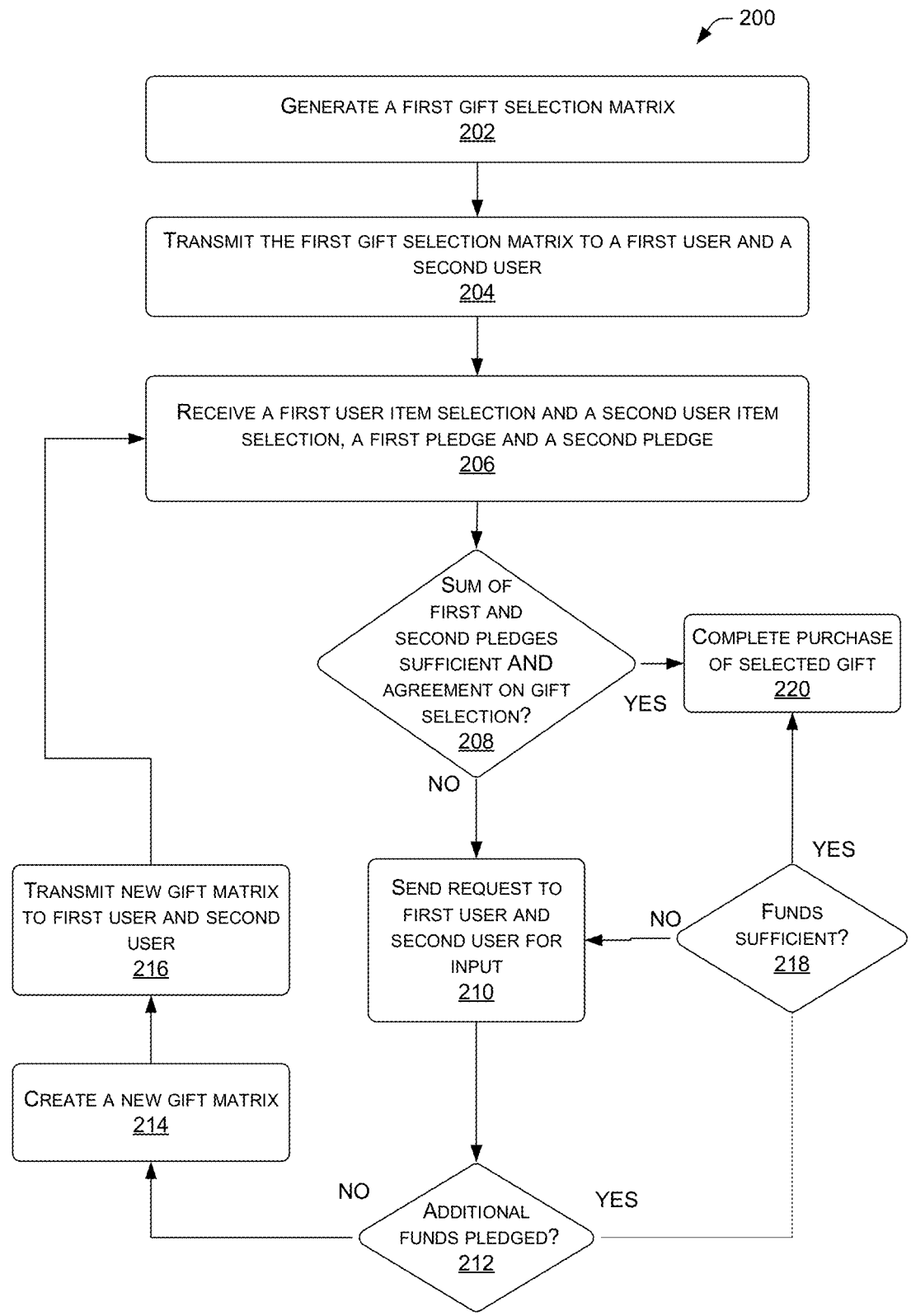
FIG. 2 is a flow diagram of an illustrative method for collaborative selection of a gift using the system of FIG. 1, according to example embodiments of the disclosure.

FIG. 2 is a flow diagram of an illustrative method for collaborative selection of a gift using the system of FIG. 1, according to example embodiments of the disclosure. At step 202, the processor 120 may generate a first gift selection matrix. Looking briefly at FIG. 3, an illustrative depiction of a gift selection matrix 300 is shown, according to example embodiments of the disclosure.

Figure 3:
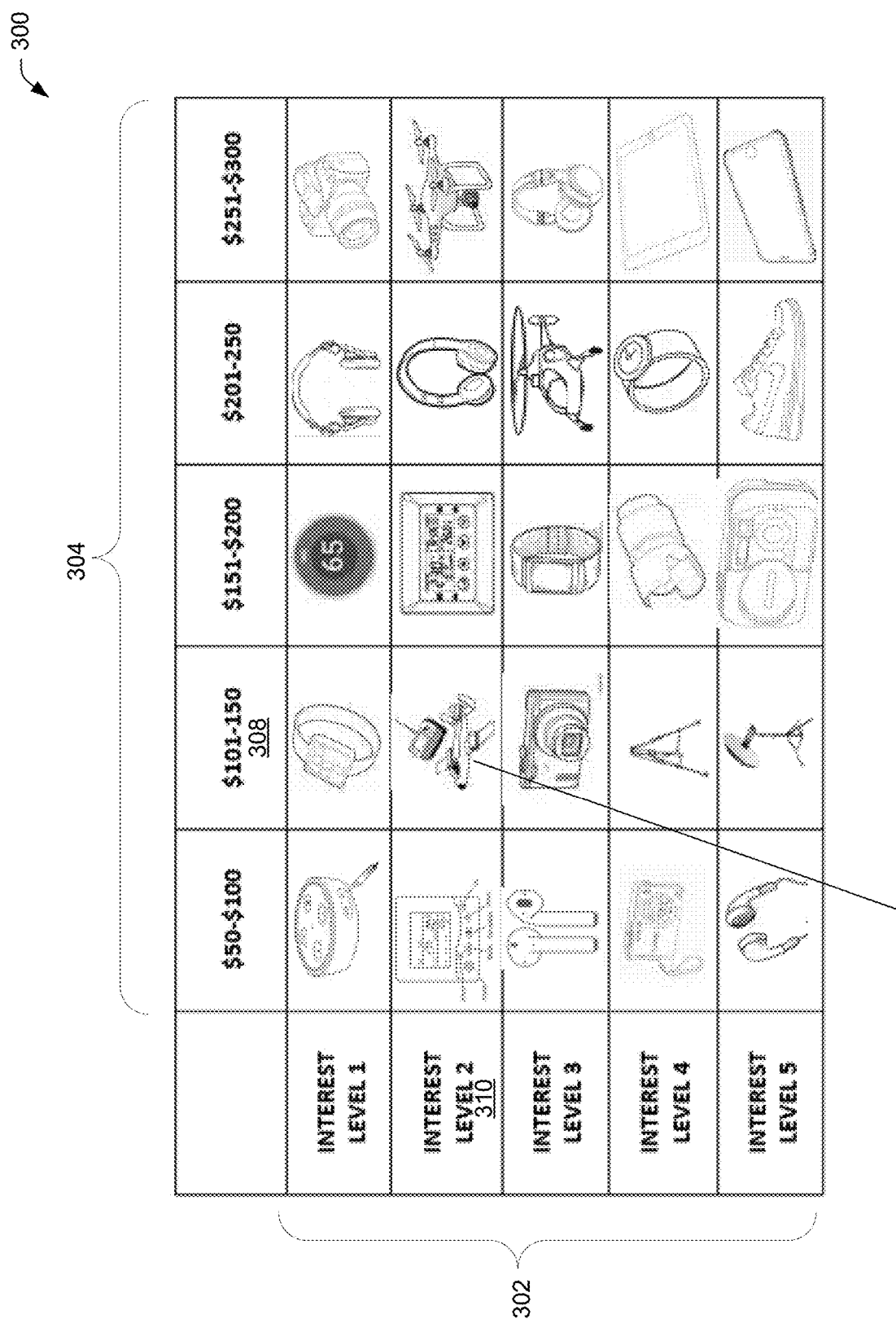
FIG. 3 is an illustrative depiction of a gift selection matrix, according to example embodiments of the disclosure.

As shown in FIG. 3, the gift selection matrix 300 includes a plurality of interest level rows 302, and a plurality of item cost columns 304. The interest levels are shown in the interest level rows 302 starting from an interest level 1 (representing the highest amount of predicted interest in an item) to interest level 5 (representing the least amount of predicted interest in an item). Although five rows are shown, it is contemplated that any number of interest levels (and thus, rows of items presented) may be included.

The item cost columns 304 are depicted as being organized in $50 price brackets. Divisions in $50 increments are demonstrative only, and should not be considered limiting. As an initial grid creation step, the processor 120 may create an empty grid having a plurality of columns 304 dividing a predetermined range of prices and the plurality of rows 302 dividing a predetermined range of interest scores.

The processor 120 populates the cells of the gift selection matrix 300 with images of potential gifts. In one embodiment, the processor 120 may retrieve, from the item selection system 130, metadata associated with a plurality of items of interest to the recipient. Image files associated with the metadata for each item may be used to generate an image of the item in the corresponding cell. For example, the image data may be stored in the item catalog 124. In one embodiment, for each respective item in the gift selection matrix 300, the processor 120 may retrieve the image based on the metadata associated with a particular item, and output the image in a corresponding cell. In other aspects, the metadata associated with an item may also include media content such as, for example, videos, user-submitted photographs, audio files, or other media content. In another aspect, the processor 120 may also retrieve metadata associated with product review for a particular product or item. For example, the metadata may include an average review value as articulated in stars, a rating score, or some other method for indicating a rating by various consumers.

As an example, a drone aircraft 306 is depicted in a column 308, which is labeled $101-$150, and a row 310, having level interest level 2. In this example, the drone aircraft 306 may have been associated with a user for whom the gift is contemplated based on that user's browsing history and purchase history. For example, the gift recipient may be associated with user profile information 127, which may indicate that he has clicked on images of the drone aircraft 306 at several occasions in the past, and has reviewed other drones having similar characteristics. Accordingly, the processor 120 has assigned a relative interest level of 2 (310), which indicates a relatively high level of interest. The drone aircraft 306 may have a purchase cost of $125, which may be determined by the price ranking module 138 in conjunction with the item catalog 124. Accordingly, the image for the drone aircraft 306 appears at column 308 and row 310.

In a similar procedure, the processor 120 may populate an empty grid with images of a plurality of items of interest. A completely populated gift selection matrix 300 is depicted with respect to FIG. 3.

Referring once again to FIG. 2, after generating a first gift selection matrix (step 202), the processor 120 may transmit the first gift selection matrix 300 to a first user computing device 116 and a second user device 118. The first user computing device 116 may be operated by the first user 112. The second user device 118 may be operated by the second user 114. Although two users are described with respect to the method 200, it is contemplated that any number of users may be included as recipients of the published gift selection matrix 300.

Figure 4:
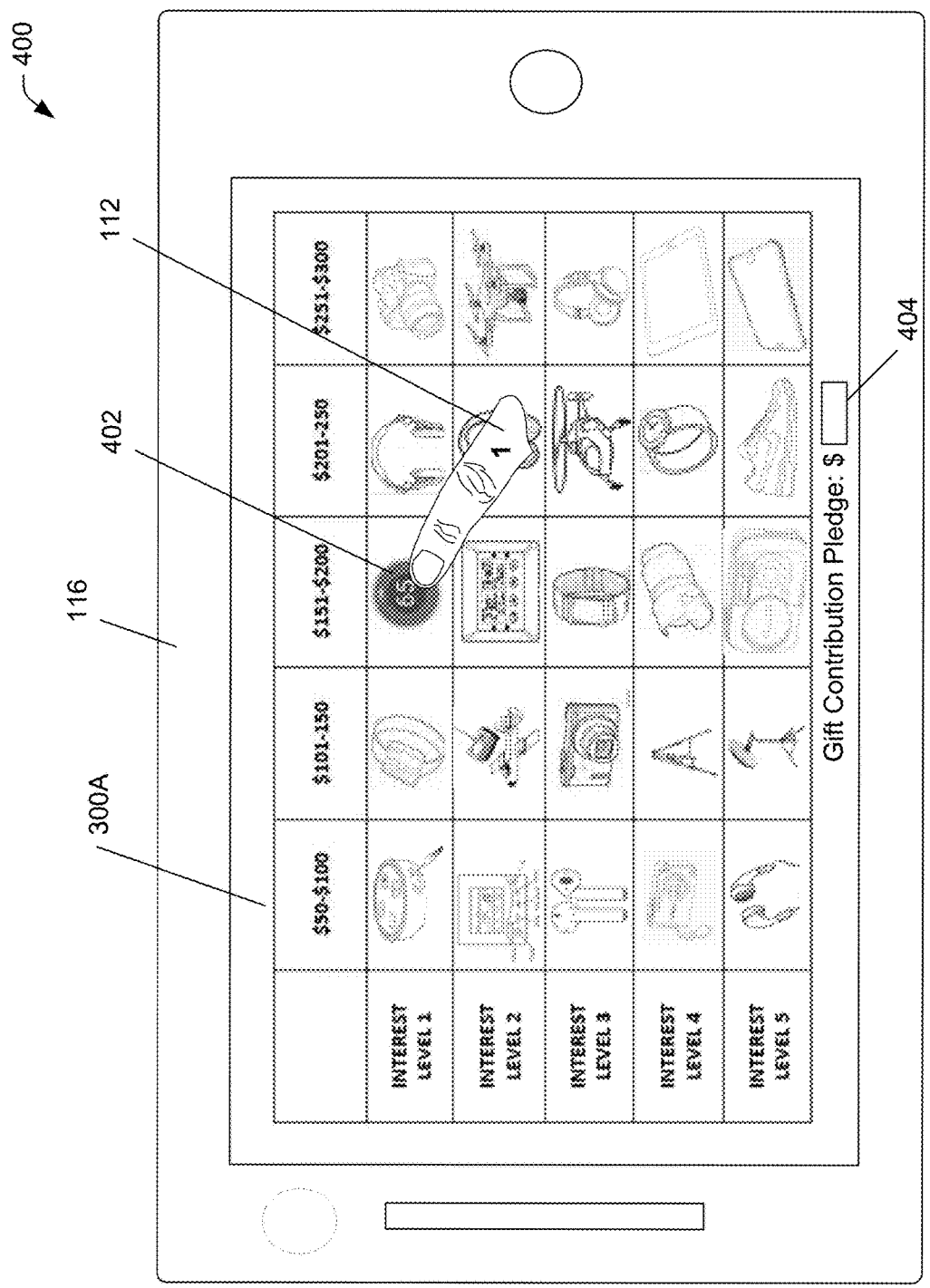
FIG. 4 is an illustrative depiction of a user selection of a gift using the gift selection matrix of FIG. 3, according to example embodiments of the disclosure.

FIG. 4 is an illustrative depiction of a user selection of a gift using the gift selection matrix of FIG. 3, according to example embodiments of the disclosure. In an embodiment, the first user 112 may receive the gift selection matrix 300 on the first user computing device 116. As an example, FIG. 4 depicts the gift selection matrix 300A as output on a display of the first user computing device 116. The first user 112 (depicted as a selecting digit 1) may select a first user item selection 402. In one aspect, the first user item selection 402 may be selected via a click, a digital selection on a touch screen, a verbal selection using a voice controlled computing input device, or some other method. The first user item selection 402 may be selected and unselected as a toggle selection. Other selection mechanisms are contemplated.

Figure 5:
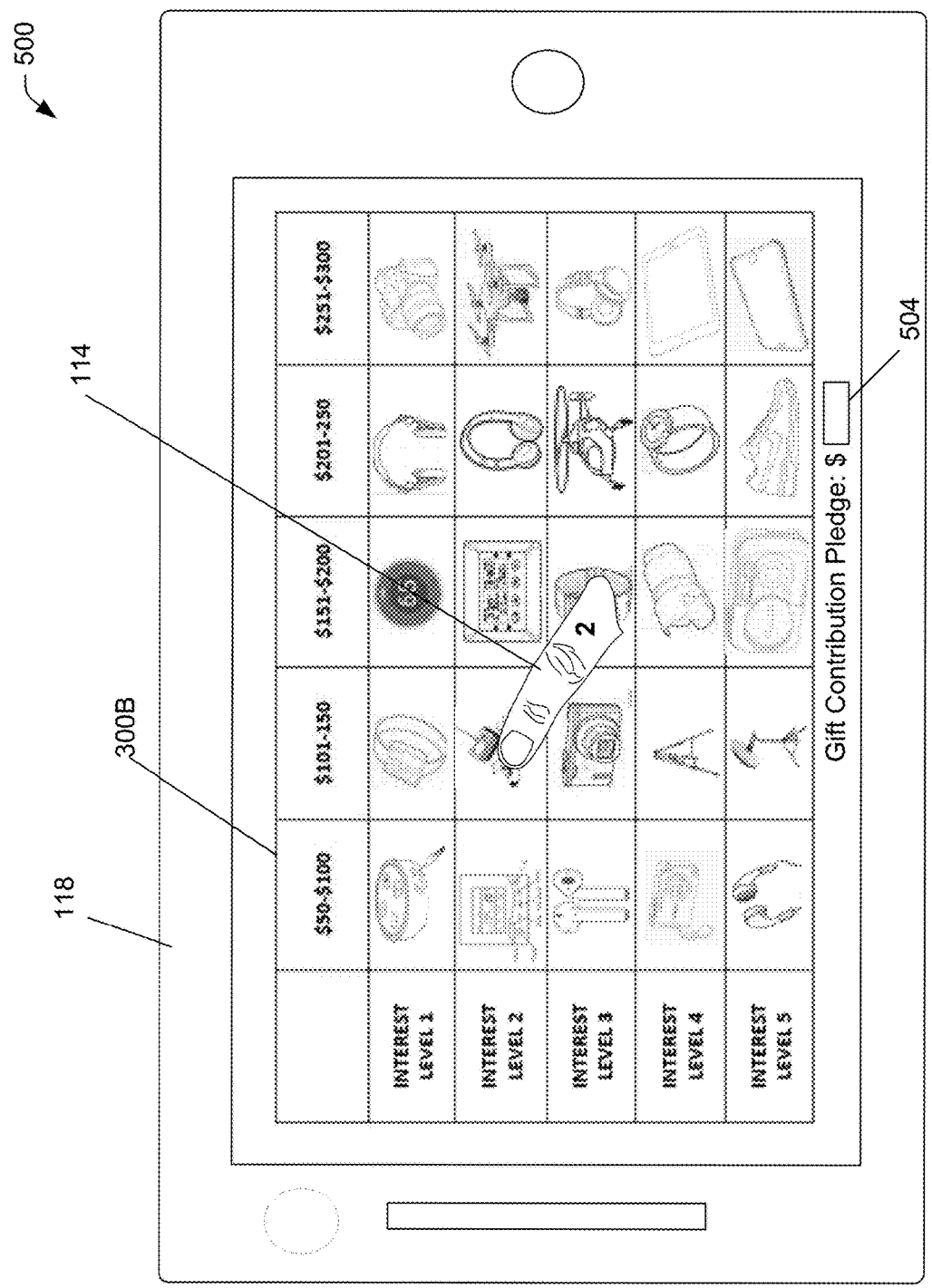
FIG. 5 is an illustrative depiction of a second user selection of a gift using the gift selection matrix of FIG. 3, according to example embodiments of the disclosure.

FIG. 5 is an illustrative depiction of a second user selection of a gift using the gift selection matrix of FIG. 3, according to example embodiments of the disclosure. As another example of user gift selection, FIG. 5 depicts the gift selection matrix 300B as received by the second user computing device 118, and output on a display of the first user computing device 116. The second user 114 (depicted as a selecting digit 2) may select a second user item selection 502. In one aspect, the second user item selection 502 may be selected via a click, a digital selection on a touch screen, a verbal selection using a voice controlled computing input device, or some other method. The first user item selection 502 may be selected and unselected as a toggle selection. Other selection mechanisms are contemplated. In an embodiment, the second user 114 may also input a second gift contribution pledge 504 to indicate an amount that they are willing to contribute toward the item selection 502.

Figure 6:
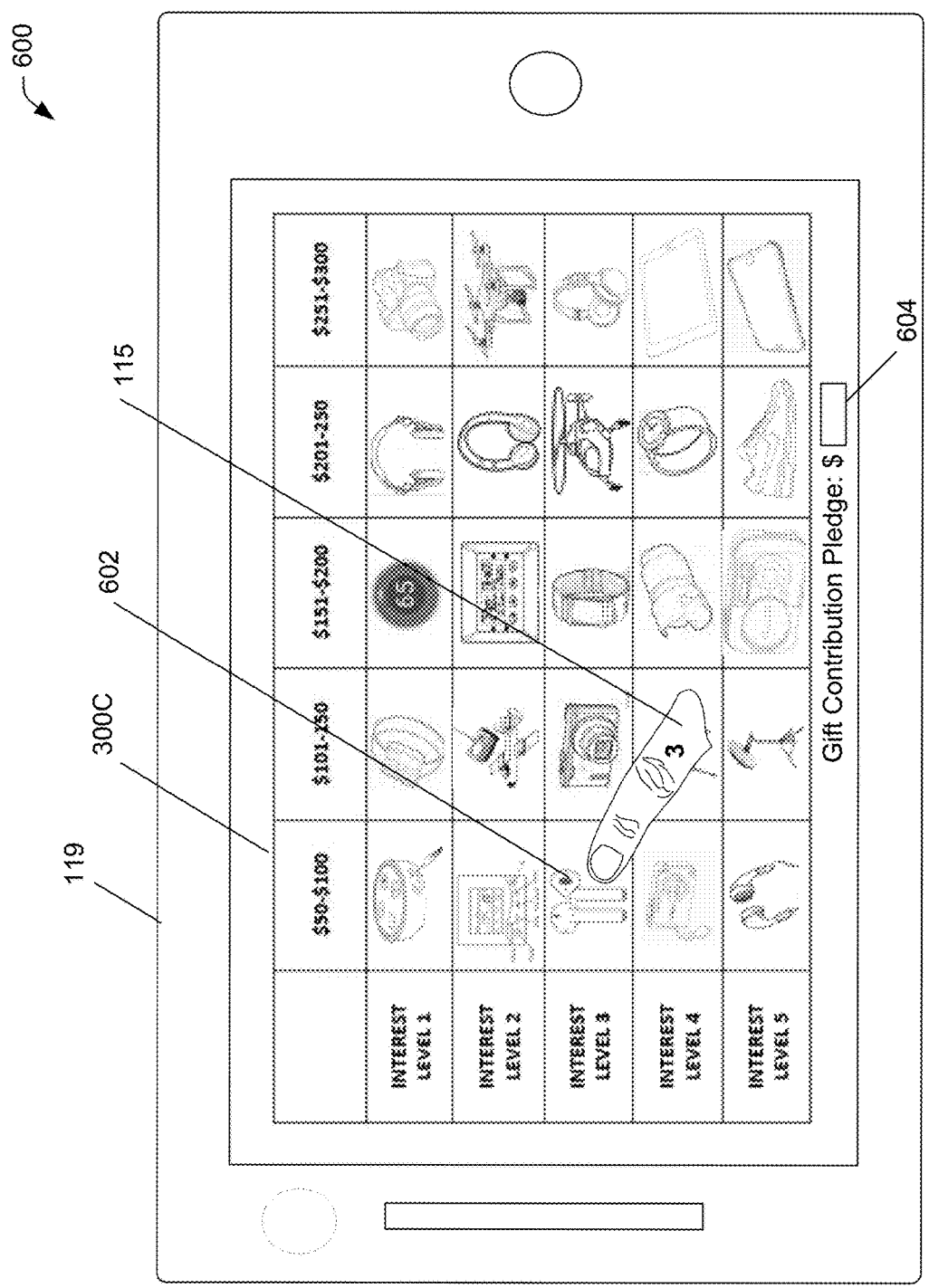
FIG. 6 is an illustrative depiction of a third user selection of a gift using the gift selection matrix of FIG. 3, according to example embodiments of the disclosure.

FIG. 6 is another illustrative depiction of a third user selection of a gift using the gift selection matrix of FIG. 3, according to example embodiments of the disclosure. As another example of user gift selection, FIG. 6 depicts the gift selection matrix 300c as received by the third user 115, as output on a display of the first user computing device 119. The third user 115 (depicted as a selecting digit 3) may select a second user item selection 602. In one aspect, the second user item selection 602 may be selected via a click, a digital selection on a touch screen, a verbal selection using a voice controlled computing input device, or some other method. The second user item selection 602 may be selected and unselected as a toggle selection. Other selection mechanisms are contemplated. In an embodiment, the third user 115 may also input a gift contribution pledge 604 to indicate an amount that they are willing to contribute toward the second user item selection 602.

Referring again to FIG. 2, after transmitting the first gift selection matrix 300 to the first user computing device 116 and the second user computing device 118 (step 204), the processor 120 may receive a first user item selection 402 from the first user computing device 116, and a second user item selection 502 from the second user computing device 118 (step 206).

At step 208, the processor 120 determines whether the sum of the first pledge 404 and the second pledge 504 is sufficient to cover the cost of either the first user item selection 402 or the second user item selection 502. If the pledged amounts are sufficient, and there is agreement on the selected item (that is, the items picked by all recipients of the gift selection matrix 300 are the same item) then the processor 120 may complete the purchase of the selected gift 220.

In the examples of FIGS. 4, 5, and 6, however, the first user 112, the second user 114, and the third user 115, have selected different items (e.g., 402, and 502, and 602, respectively). Accordingly, if the processor 120 determines that the sum of the first pledge 404 the second pledge 504, and the third pledge 604 is insufficient to cover the cost of at least one of the gift selections, the processor 120 may send a request to the first user, the second user 114, and the third user 115 (via the first user computing device 116 and the second user computing device 118). The request may present a selectable choice to each of the participants to either: 1) increase their respective pledge, or 2) create a second gift selection matrix having a lower cost limit, which makes the gift purchasable given the pledged amount of funds from the group of participants.

At step 212, the processor may receive the responses (to the selectable choice described above) from the first and second user, and determine whether one or more of the users have provided additional (increased) pledges for gift contributions. If they have provided additional contributions, the processor may determine again whether the amount is sufficient (step 218), and either complete the purchase of the selected gift (if there was consensus on the choice) (step 220) or submit a second request to the participants 210 to provide input.

Responsive to determining that there were no additional funds pledged from the users 112, 114, and 115, and the users wish to select from a lower price range of gift ideas, the processor 120 may create a second gift matrix with a lower cost limit at step 214.

At step 216, the processor 120 may transmit the new gift matrix to the first user computing device 116 and the second user computing device 118. In an iterative fashion, the respective first user and second user devices may output the new gift matrix on the respective devices. The first user and the second user may provide further inputs to the devices. That is to say, the receiving computing devices (116, 118) again receive the first user item selection and the second user items selections, along with first user pledge and a second user pledge. The process steps may continue iteratively until an initiation of a purchase is made (step 220).

Figure 7:
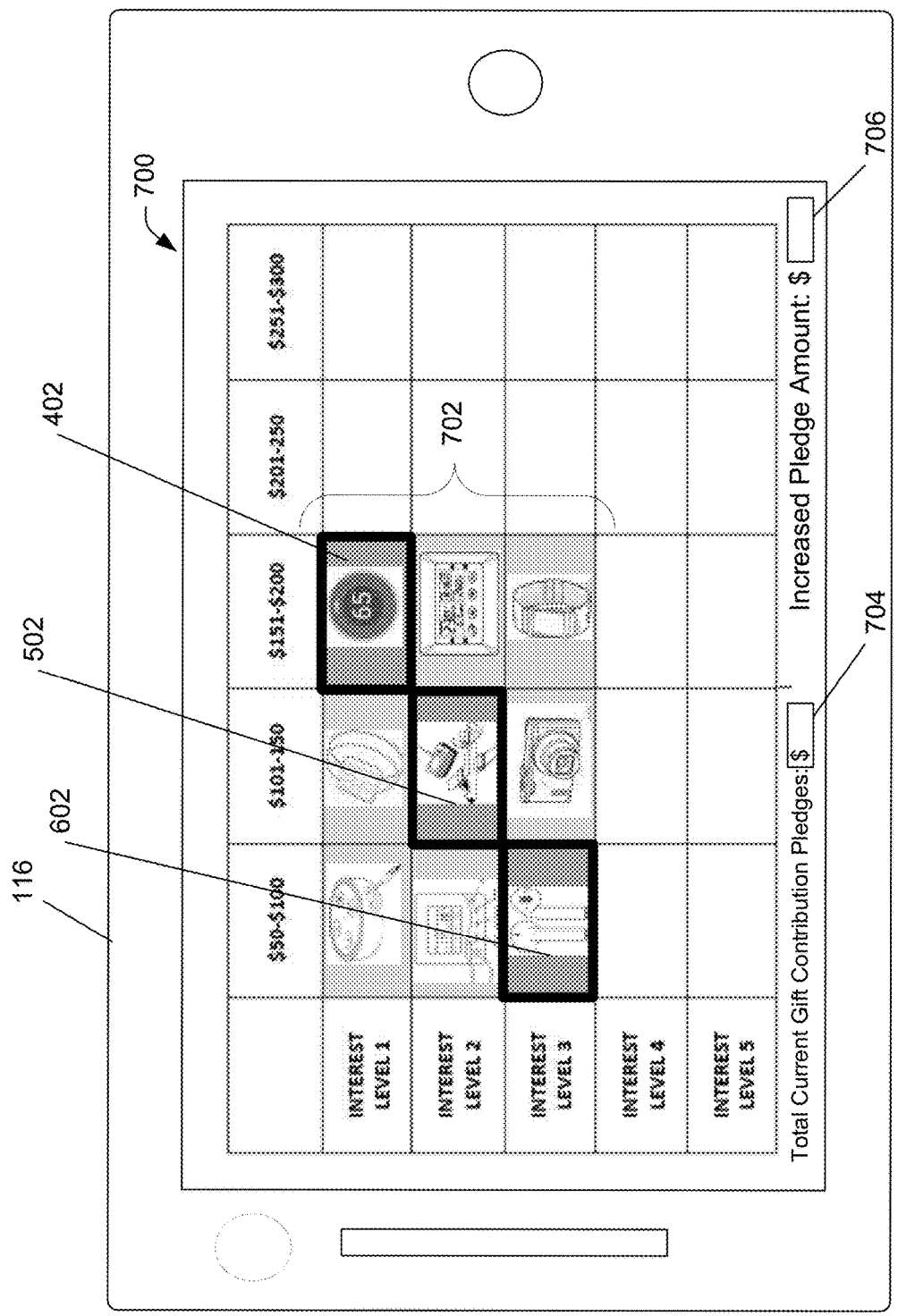
FIG. 7 is an illustrative depiction of a cluster of selected gifts on a gift selection matrix, according to example embodiments of the disclosure.
Figure 8:
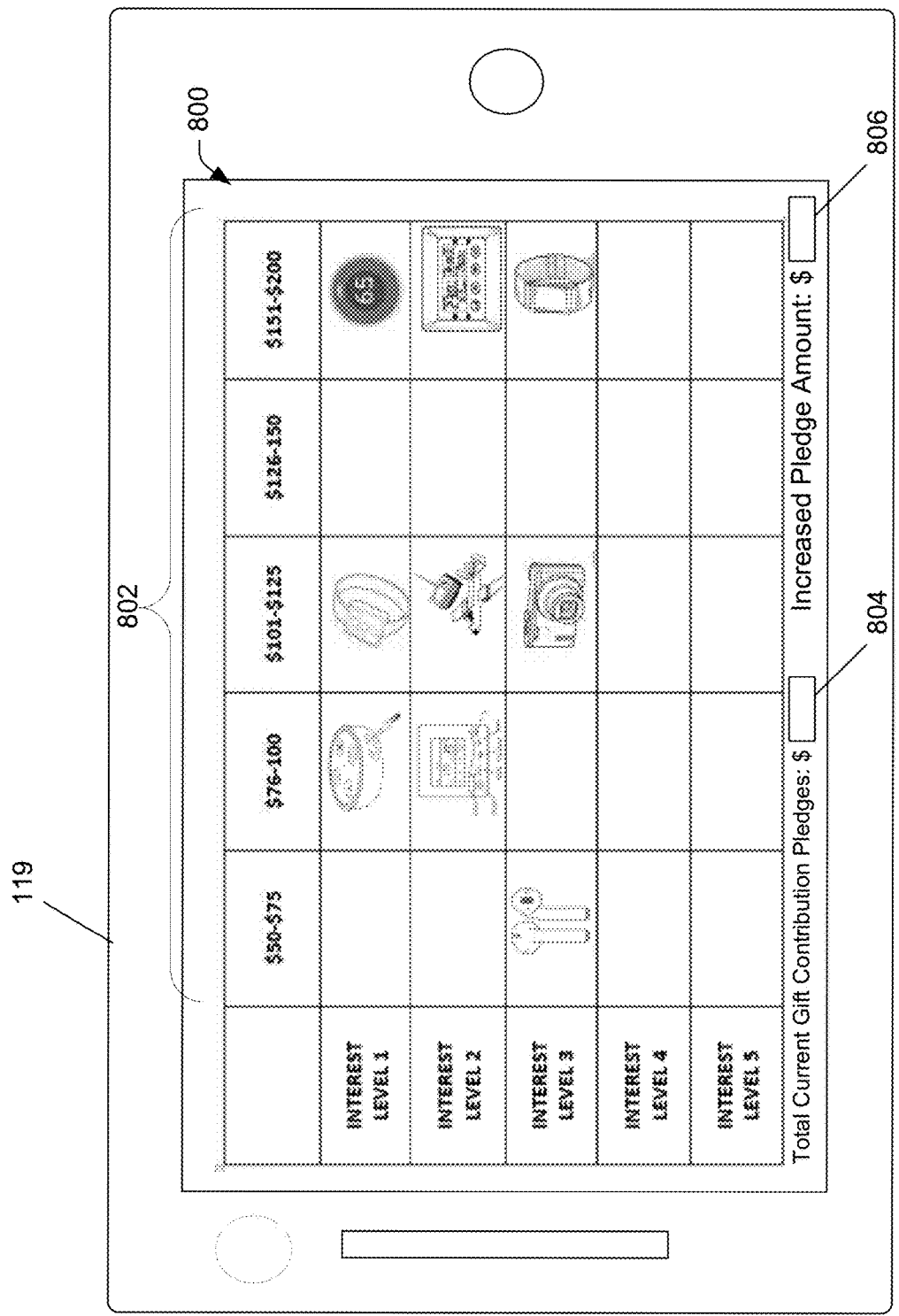
FIG. 8 is an illustrative depiction of another generated gift selection matrix, according to example embodiments of the disclosure.

As a brief overview, at this step, the processor 120 distills down the suggested gift selections by identifying items that are nearby (or clustered) near the selected items on the first gift selection matrix 300. Those selected items are either presented for a second-round selection if the available funds are sufficient for at least some of the gifts. If the funds are not sufficient and the group participants have not elected to provide additional contributions, another matrix is presented having lower gift prices for the selectable gifts. FIGS. 7 and 8 depict steps for creating a second matrix.

Starting first with FIG. 7, an illustrative depiction of a cluster of selected items 702 is shown, according to example embodiments of the disclosure. The second-round gift matrix 700 is shown in FIG. 7 as displayed on the first user computing device 116. The cluster of selected items 702 includes the gift selection options that are contiguous to (that is, touching) the item selections 402, 502, and 602. The cluster of selected items 702 is relevant because of the organizational structure of the gift selection matrix 700. For example, because the gifts are arranged in order of decreasing interest and increasing price, the gifts contiguous to the selected items 402, 502, 602, are close to the selections in both price and interest. By removing all other items, the participants (e.g., users 112, 114, and 115) may focus on the most relevant selectable items and advocate for their selection and/or re-select another item. In the example of FIG. 7, there may be a sufficient sum of pledge funds available to make the purchase of at least some of the items presented on the gift matrix. The second round gift matrix 700 now shows a sum of the current gift contribution pledges 704. The users (in the case of the first user device 116, the first user 112) may increase their pledge amount by inputting an increased pledge amount 706. If, during the second round of selecting, there is consensus on a particular gift that is more than the available pledge amount (shown the current gift contribution pledges 704), the system 104 may send another request for increased pledges to make up the difference in price, and/or may output an on-screen message indicative of the need for additional pledged funds. If no consensus is reached, or there is insufficient contribution money available, the system may publish another matrix (step 214). The new gift matrix may have a lower cost limit if the pledged funds are insufficient to purchase one or more of the gifts from the first gift matrix. In another example, the new gift matrix may have the same cost limits, with some or all of the items replaced with new system-selected or user-recommended gift selection items.

Accordingly, the processor 120 may re-calibrate the second-round gift matrix 800 to include, as a maximum limit, gifts having a cost equal to the sum of all of the pledged contributions. For example, as shown in FIG. 8, the maximum cost item is now $200, whereas the first-round gift selection matrix 300 had items up to $300 in cost. The processor 120 then creates a second-round gift matrix 800, and outputs the second-round gift matrix 800 on a user device (e.g., the first user computing device 119 as shown in FIG. 8) with re-calibrated item cost columns 802. The system may also output a current gift contribution pledged amount 804 (having the sum of all pledged contributions), and may further include an input 806 for increasing the pledged amount. The processor 120 may populate the gift matrix with the selected items from the first-round gift matrix, which are placed at the appropriate column and row according to price and predicted interest. The system may further populate the second-round gift matrix 800 with the items of interest that were not selected but clustered around the selected gifts (items not shown). To further populate the second-round gift matrix 800, the processor 120 may retrieve, from the item selection system 130, a second plurality of items (not shown) based on the cluster of selected items 702.

Although not shown, in one aspect, after several rounds the first and second users may not agree on a gift selection, or the gift contributions may not be sufficient for a mutually-agreeable gift selection. In one embodiment, in place of step 208, if the sum of the first and second pledges may not be sufficient. In the embodiment, a resultant step may include a gift card being automatically-selected by the system as the selected gift purchase. A triggering event for the automatic gift card selection may be set by the system for this option based on one or more user inputs. For example, a user may indicate that, after three rounds, if consensus is not made on a gift, or if the sum of pledges is insufficient for a purchase, then the system should purchase a gift card in lieu of the gift selection items in the gift matrix. Other options are contemplated as triggering events, including insufficient participation by one or more of the users, a predetermined period of time that has passed, a date at which a gift selection must be made, and other triggering events.

Figure 9:
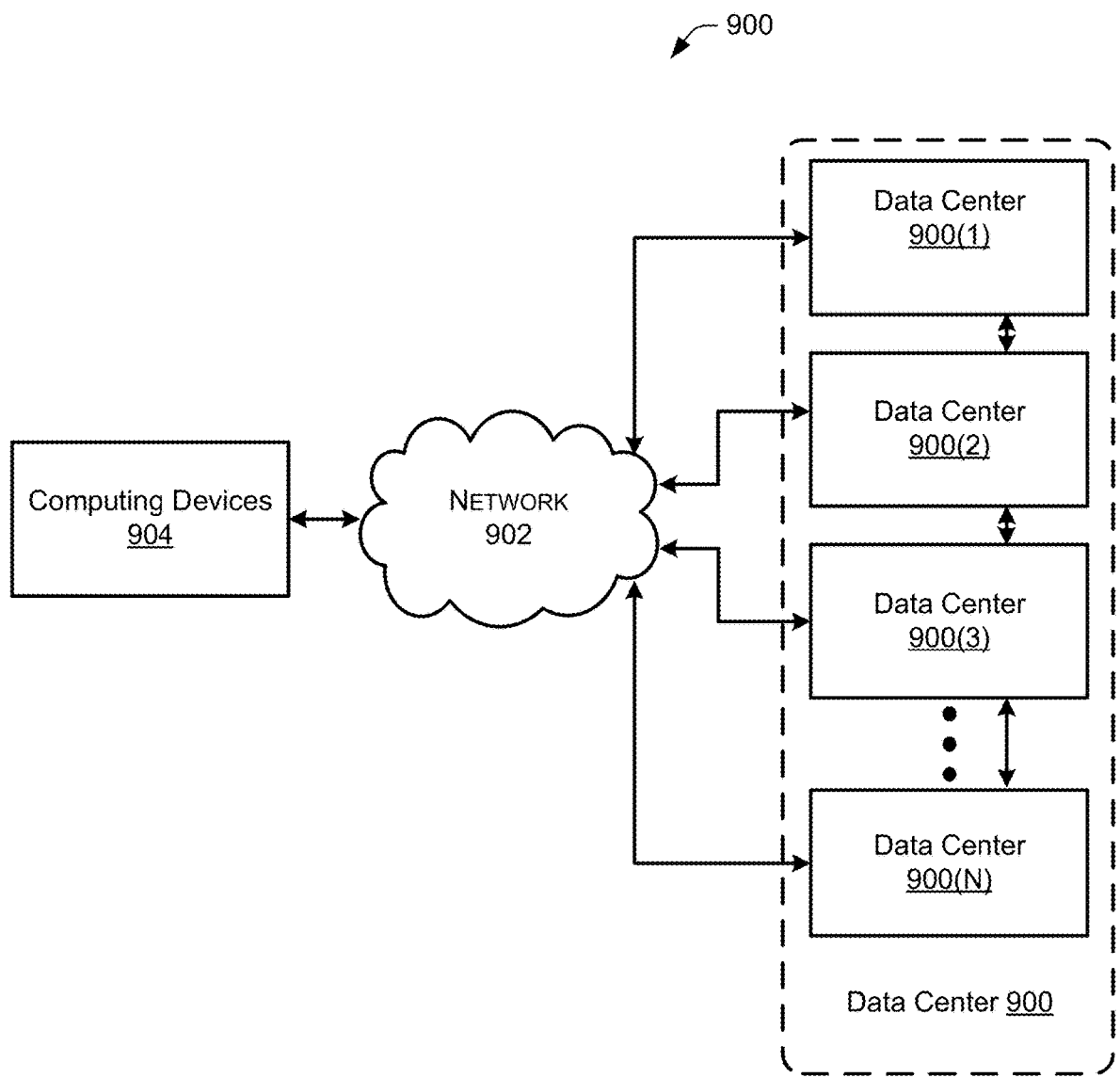
FIG. 9 is a system and network diagram that shows an illustrative operating environment that includes a system that can be configured to implement aspects of the functionality described herein, according to example embodiments of the disclosure.

FIG. 9 is a system and network diagram that shows an illustrative operating environment that includes a data center 900 that can be configured to implement aspects of the functionality described herein, according to example embodiments of the disclosure. As discussed briefly above, the data center 900 can execute archive services that provide improved avoidance of hash collisions. As discussed above, the system may be part of a larger system that provides the additional computing resources that include, without limitation, data storage resources, data processing resources, such as virtual machine (VM) instances, networking resources, data communication resources, network services, and other types of resources.

Each type of computing resource provided by system, or by a larger system of which the system is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The system, or a larger system of which the system is a part, can also be configured to provide other types of computing resources not mentioned specifically herein.

The computing resources provided by system, or a larger system of which the system is a part, are enabled in one implementation by one or more data centers 900(1), 900(2), 900(3), . . . , 900(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 10.

The users of the system can access the computing resources, such as the item catalog 124, the thread store 126, and/or the user profile store 128, provided by the system over a network 902, which can be a wide area communication network ("WAN"), such as the Internet, an intranet or an Internet service provider ("ISP") network or a combination of such networks. For example, and without limitation, a computing device 904 (e.g., the client device, application developer system, etc.,) operated by a user of the system can be utilized to access the system by way of the network 902. It should be appreciated that a local-area network ("LAN"), the Internet, or any other networking topology known in the art that connects the data centers to remote users and other users can be utilized. It should also be appreciated that combinations of such networks can also be utilized.

Figure 10:
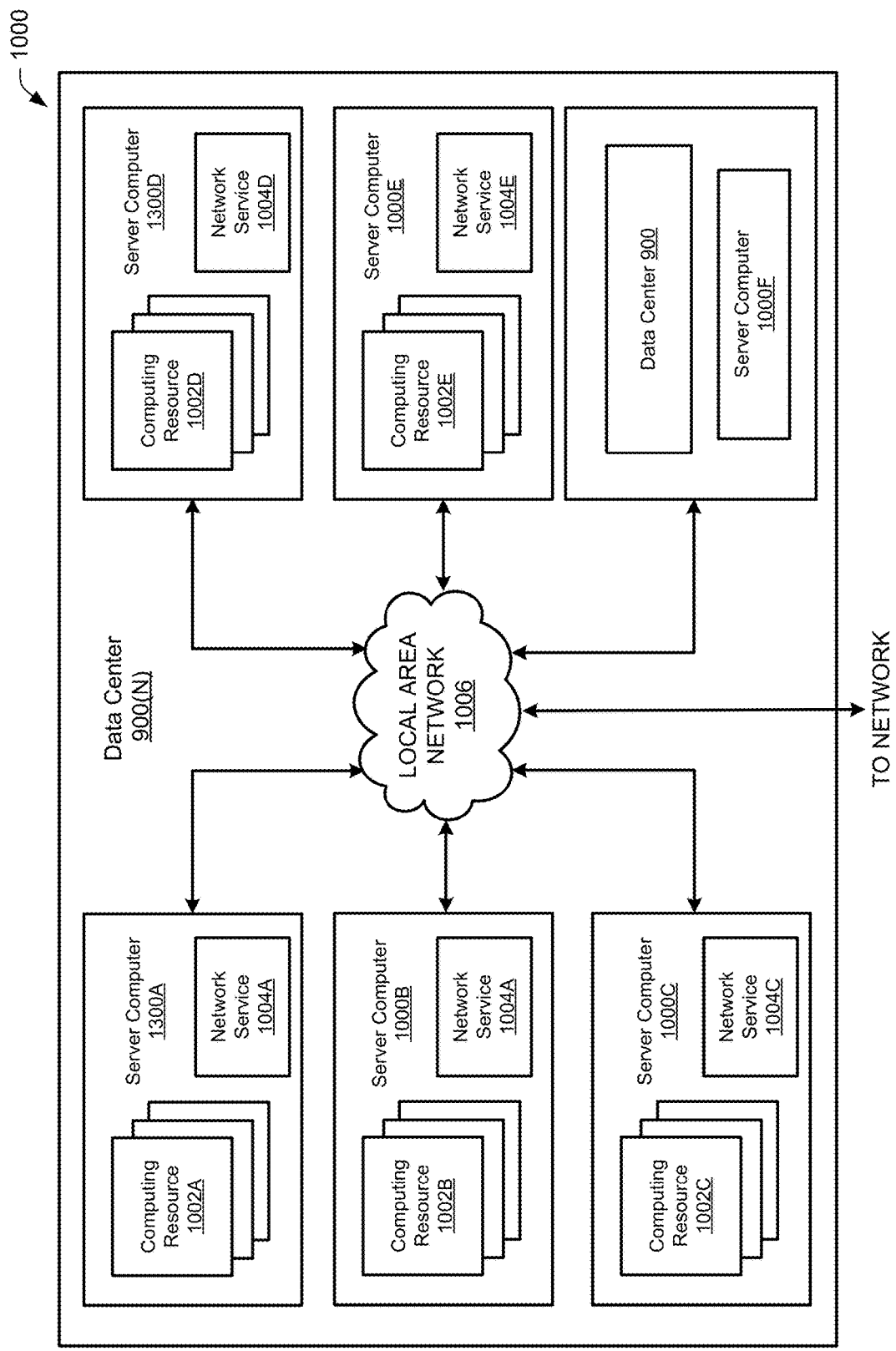
FIG. 10 is a computing system diagram illustrating a configuration for a data center that can be utilized to implement aspects of the technologies disclosed herein, according to example embodiments of the disclosure.

FIG. 10 is a computing system diagram illustrating a configuration for a data center 900(N) that can be utilized to implement aspects of the technologies disclosed herein, according to example embodiments of the disclosure.

These technologies may include the item selection system 130, the social media interface engine 134, and/or the gift matrix generator 144. The example data center 900(N) shown in FIG. 10 includes several server computers 1000A-1000F (collectively 1000) for providing the computing resources 1002A-1002E (collectively 1002), respectively.

The server computers 1000 can be standard tower, rackmount, or blade server computers configured appropriately for providing the various computing resources described herein (illustrated in FIG. 10 as the computing resources 1002A-1002E). As mentioned above, the computing resources 1002 provided by the system, or a larger system of which the system is a part, can include, without limitation, analytics applications, data storage resources, data processing resources such as VM instances or hardware computing systems, database resources, networking resources, and others. Some of the servers 1000 can also be configured to execute network services 1004A-1004E (collectively 1004) capable of instantiating, providing and/or managing the computing resources 1002, some of which are described in detail herein.

The data center 900(N) shown in FIG. 10 also includes a server computer 1000F that can execute some or all of the software components described above. For example, and without limitation, the server computer 1000F can be configured to execute the archiving service system(s) 130. The server computer 1000F can also be configured to execute other components and/or to store data for providing some or all of the functionality described herein. In this regard, it should be appreciated that components or different instances of the archive service systems 140 can execute on many other physical or virtual servers in the data centers 900 in various configurations.

In the example data center 900(N) shown in FIG. 10, an appropriate LAN 1006 is also utilized to interconnect the server computers 1000A-1000F. The LAN 1006 is also connected to the network 902 illustrated in FIG. 9. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 900(1)-(N), between each of the server computers 1000A-1000F in each data center 900, and, potentially, between computing resources 1002 in each of the data centers 900. It should be appreciated that the configuration of the data center 900 described with reference to FIG. 10 is merely illustrative and that other implementations can be utilized.

Figure 11:
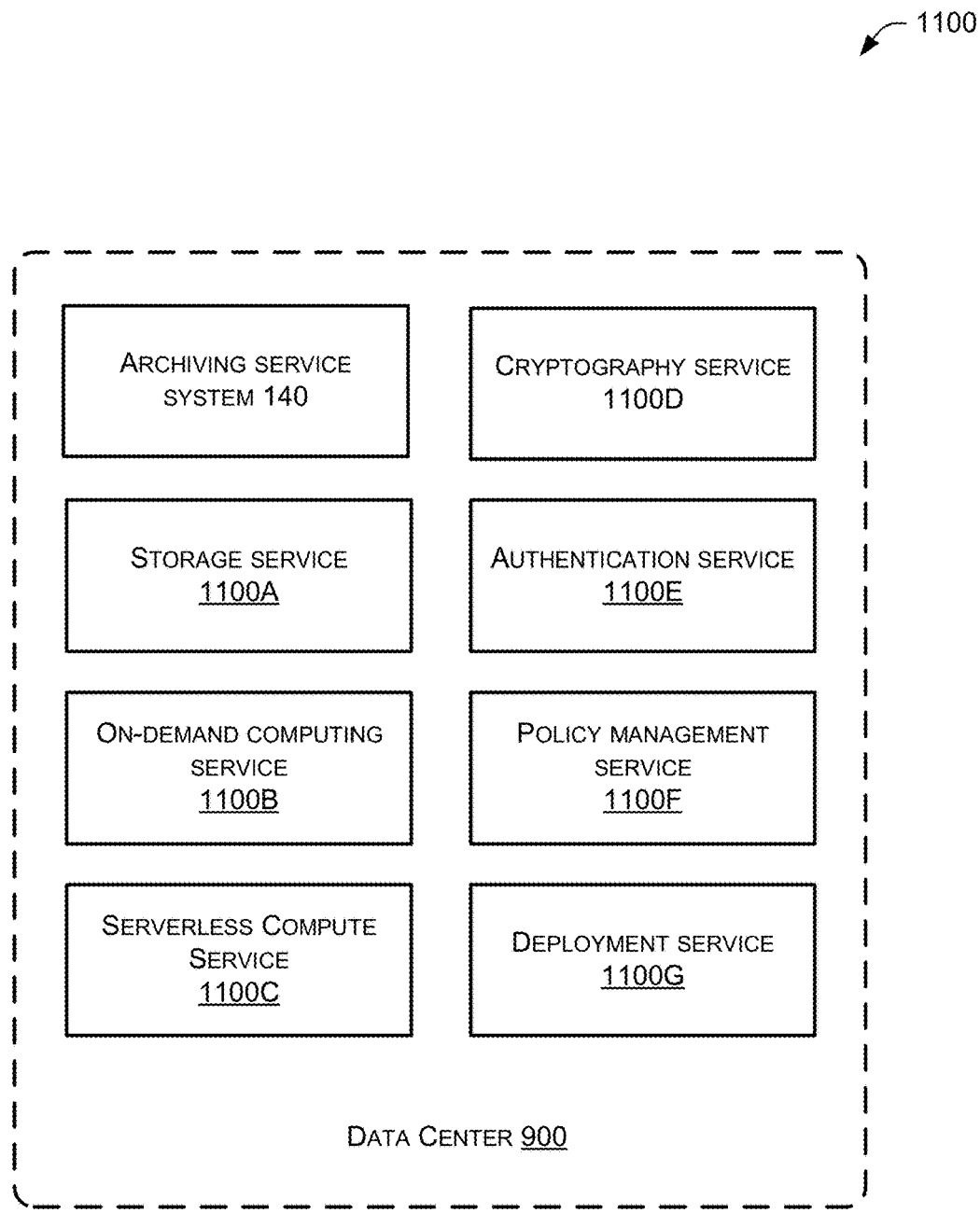
FIG. 11 is a network services diagram that shows aspects of several services that can be provided by and utilized within a system, or a larger system of which the system is a part, which is configured to implement the various technologies disclosed herein, according to example embodiments of the disclosure.

FIG. 11 is a network services diagram that shows aspects of several services that can be provided by and utilized within a system, or a larger system of which the system is a part, which is configured to implement the various technologies disclosed herein, according to example embodiments of the disclosure.

In particular, and as discussed above, the system, or a larger system of which the system is a part, can provide a variety of network services to users and other users including, but not limited to, the hosted data center 102, a storage service 1100A, an on-demand computing service 1100B, a serverless compute service 1100C, a cryptography service 1100D, an authentication service 1100E, a policy management service 1100F, and a deployment service 1100G. The system, or a larger system of which the system is a part, can also provide other types of network services, some of which are described below.

It is also noted that not all configurations described include the network services shown in FIG. 11 and that additional network services can be provided in addition to, or as an alternative to, the services explicitly described herein. Each of the services shown in FIG. 11 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 11 will now be provided.

The storage service 1100A can be a network-based storage service that stores data obtained from users of the system, or a larger system of which the system is a part. The data stored by the storage service 1100A can be obtained from computing devices of users, such as one or more users of the hosted data center 102.

The on-demand computing service 1100B can be a collection of computing resources configured to instantiate VM instances and to provide other types of computing resources on demand. For example, a user of the system, or a larger system of which the system is a part, can interact with the on-demand computing service 1100B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1100B is shown in FIG. 11, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1100C is a network service that allows users to execute code (which might be referred to herein as a "function") without provisioning or managing server computers in the system, or a larger system of which the system is a part. Rather, the serverless compute service 1100C can automatically run code in response to the occurrence of events. The code that is executed can be stored by the storage service 1100A or in another network accessible location.

In this regard, it is to be appreciated that the term "serverless compute service" as used herein is not intended to infer that servers are not utilized to execute the program code, but rather that the serverless compute service 1100C enables code to be executed without requiring a user to provision or manage server computers. The serverless compute service 1100C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1100D. The cryptography service 1100D can utilize storage services of the system, or a larger system of which the system is a part, such as the storage service 1100A, to store encryption keys in encrypted form, whereby the keys can be usable to decrypt user keys accessible only to particular devices of the cryptography service 1100D. The cryptography service 1100D can also provide other types of functionality not specifically mentioned herein.

The system, or a larger system of which the system is a part, in various configurations, also includes an authentication service 1100E and a policy management service 1100F. The authentication service 1100E, in one example, is a computer system (i.e., collection of computing resources 1002) configured to perform operations involved in authentication of users or customers. For instance, one of the services shown in FIG. 11 can provide information from a user or customer to the authentication service 1100E to receive information in return that indicates whether or not the requests submitted by the user or the customer are authentic.

The policy management service 1100F, in one example, is a network service configured to manage policies on behalf of users or customers of the system, or a larger system of which the system is a part. The policy management service 1100F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1100G for deploying program code in some configurations. The deployment service 1100G provides functionality for deploying program code, such as to virtual or physical hosts provided by the on-demand computing service 1100B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 12:
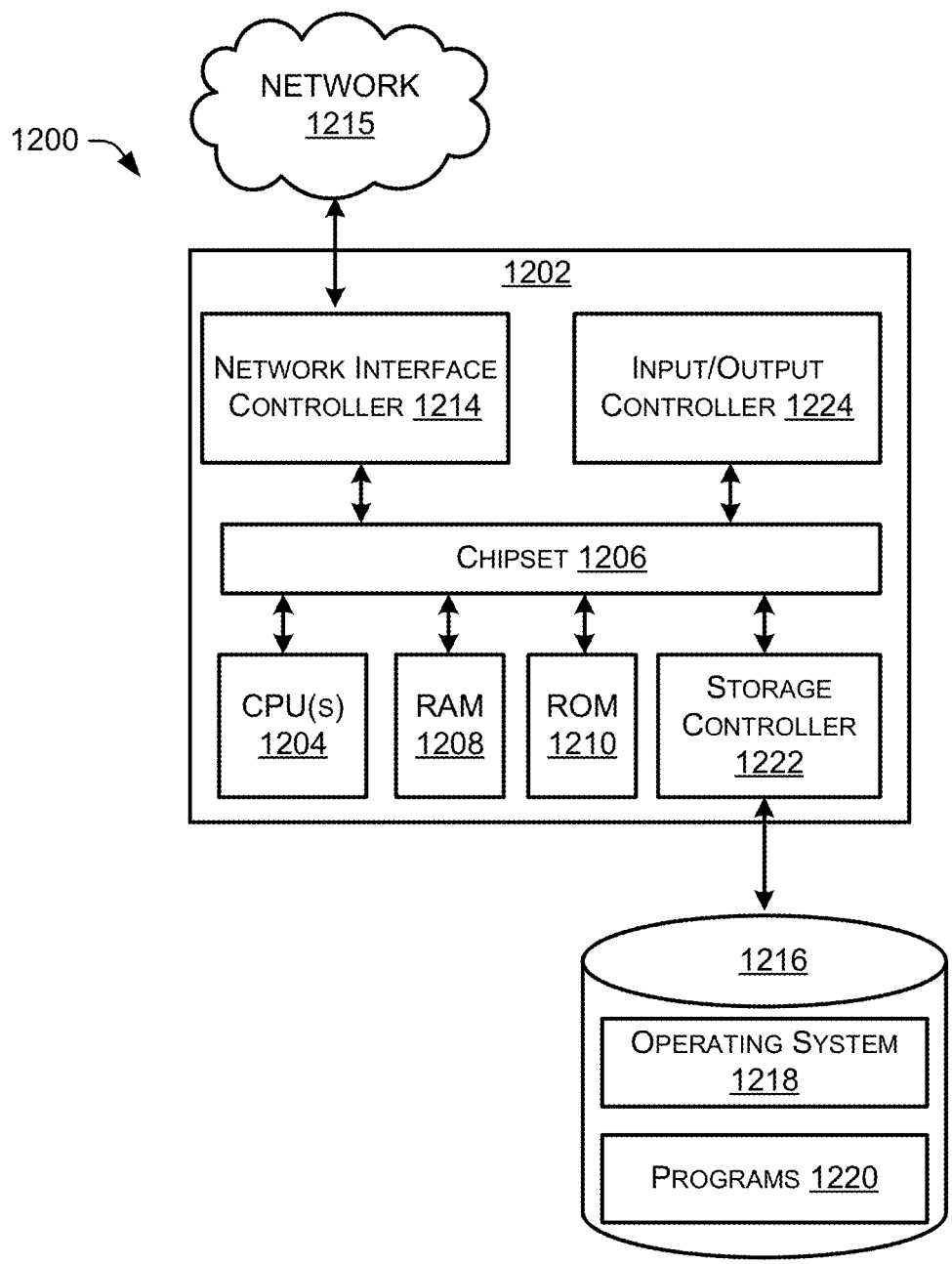
FIG. 12 is a computer architecture diagram showing an illustrative computer hardware architecture for implementing a computing device that can be utilized to implement aspects of the various technologies presented herein, according to example embodiments of the disclosure.

FIG. 12 is a computer architecture diagram showing an illustrative computer hardware architecture for implementing a computing device that can be utilized to implement aspects of the various technologies presented herein, according to example embodiments of the disclosure. The computer architecture shown in FIG. 12 illustrates a conventional server computer, workstation, desktop computer, laptop, tablet, network appliance, e-reader, smartphone, or other computing device, and can be utilized to execute any of the software components presented herein. The computer 1200 may represent architecture for a naming service, a concentrator, a reader, and/or other devices described herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1215. The chipset 1206 can include functionality for providing network connectivity through a NIC 1214, such as a gigabit Ethernet adapter. The NIC 1214 is capable of connecting the computer 1200 to other computing devices over the network 1215. It should be appreciated that multiple NICs 1214 can be present in the computer 1200, connecting the computer to other types of networks and remote computer systems.

The computer 1200 can be connected to a mass storage device 1216 that provides non-volatile storage for the computer. The mass storage device 1216 can store an operating system 1218, programs 1220, and data, which have been described in greater detail herein. The mass storage device 1216 can be connected to the computer 1200 through a storage controller 1222 connected to the chipset 1206. The mass storage device 1216 can consist of one or more physical storage units. The storage controller 1222 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1216 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1216 is characterized as primary or secondary storage, and the like.

For example, the computer 1200 can store information to the mass storage device 1216 by issuing instructions through the storage controller 1222 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1216 by detecting the physical states or characteristics of one or more particular locations within the physical storage units.

In addition to the mass storage device 1216 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1216 can store an operating system 1218 utilized to control the operation of the computer 1200. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1216 can store other system or application programs and data utilized by the computer 1200.

In one configuration, the mass storage device 1216 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to one configuration, the computer 1200 has access to computer-readable storage media storing computer-executable instructions which, when executed by the computer 1200, perform the various processes described above. The computer 1200 can also include computer-readable storage media for performing any of the other computer-implemented operations described herein.

The computer 1200 can also include one or more input/output controllers 1224 for receiving and processing input from a number of input devices, such as a keyboard, a mouse, a touchpad, a touch screen, an electronic stylus, or other type of input device. Similarly, an input/output controller 1224 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or can utilize an architecture completely different than that shown in FIG. 12.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
one or more computer-readable media storing computer-executable instructions that, when executed, cause the one or more processors to perform acts comprising:
determining, based on one or more interests associated with a recipient and based on a determined intent to create a group gift selection, a first gift selection matrix comprising a set of items associated with the recipient;
transmitting the first gift selection matrix to a first user computing device for display via a first display of the first user computing device;
transmitting, by the one or more processors, the first gift selection matrix to a second user computing device for display via a second display of the second user computing device;
receiving a first user item selection associated with the set of items included in the first gift selection matrix;
receiving a first pledge indicative of a first gift purchase contribution amount;
receiving a second user item selection associated with the set of items included in the first gift selection matrix;
receiving a second pledge indicative of a second gift purchase contribution amount;
determining that the sum of the first pledge and the second pledge is insufficient to cover a cost of neither the first user item selection nor the second user item selection;
causing, in response to receiving the first user item selection, the second user item selection, the first pledge, and the second pledge, one or more items included in the first gift selection matrix to be omitted from a second gift selection matrix that is generated subsequent to the first gift selection matrix, wherein causing the one or more items to be omitted from the second gift selection matrix includes:
determining first metadata included in one or more cells of the first gift selection matrix that are associated with one or more unselected items of the set of items and that are non-contiguous to at least one of a first cell of the first gift selection matrix associated with the first user item selection or a second cell of the first gift selection matrix associated with the second user item selection; and
in response to the first user item selection and the second user item selection, removing the first metadata from the one or more cells, thereby making the one or more cells available for second metadata associated with different items;
determining, by the one or more processors, in response to receiving the first user item selection and the first pledge and in response to receiving the second user item selection and the second pledge, the second gift selection matrix omitting the one or more items and presenting a first selectable option to adjust a pledge amount or a second selectable option and a third selectable option to select a different item from the set of items, the second selectable option and the third selectable option being arranged, based on a ranking of the set of items in the first gift selection matrix with respect to one another, adjacent to one another in the second gift selection matrix;
transmitting the second gift selection matrix to the first user computing device for display via the first display of the first user computing device;
transmitting the second gift selection matrix to the second user computing device for display via the second display of the first user computing device;
receiving, via the first display of the first user computing device, an alternative first user item selection;
receiving, via the second display of the second user computing device, an alternative second user item selection; and
responsive to determining that a second sum of the first pledge and the second pledge is sufficient to purchase at least one of the alternative first user item or and the alternative second user item selection, initiating a purchase transaction for the at least one of the alternative first user item selection or the alternative second user item selection.

2. The system of claim 1, wherein generating the first gift selection matrix comprises:
retrieving, from an item selection system, metadata associated with a plurality of items of interest to the recipient, the plurality of items of interest comprising a first item having a first item cost and a first item interest score, a second item having a second item cost and a second item interest score, and a third item having a third item cost and a third item interest score;
creating an empty grid having a plurality of columns dividing a predetermined range of prices and a plurality of rows dividing a predetermined range of interest scores, wherein the predetermined range of interest scores are indicative of a predicted interest of a respective item to the recipient; and
populating, using the metadata, the empty grid with the first item, the second item, and the third item based on the first item cost, the first item interest score, the second item cost, the second item interest score, the third item cost and the third item interest score.

3. The system of claim 2, wherein the processor generates the second gift selection matrix by:
identifying a cluster of items from the first gift selection matrix, the cluster of items comprising items proximate to the first user item selection and the second user item selection on the first gift selection matrix;
retrieving, from the item selection system, a second plurality of items based on the cluster of items;
creating a second empty grid having a plurality of columns associated with a second range of prices, the second range of prices having a maximum limit equal to the sum of the first pledge and the second pledge, and a plurality of rows associated with the predetermined range of interest scores; and populating the empty grid with the first item, the second item, the third item, and a fourth selected item of the second plurality of items, wherein the fourth selected item is based on the cluster of items.

4. The system of claim 3, wherein the processor generates the second gift selection matrix by:

receiving, via one or more of the first display of the first user computing device and the second display of the second user computing device, a selection of a custom item for adding to the second gift selection matrix;

retrieving, from the item selection system, an interest score and a cost for the custom item; and populating the empty grid with the custom item.

5. The system of claim 1, wherein responsive to determining that a sum of the first pledge and the second pledge is greater than the cost of an item selection, the processor reduces the first pledge and the second pledge by a proportional amount equal to a difference between the sum of the first pledge and the second pledge and the cost of the item selection; and completing the purchase transaction.

6. A method comprising:

generating, by a computing device, a first gift selection matrix comprising a set of items of interest to a recipient, the first gift selection matrix comprising columns of increasing cost and rows of decreasing interest to the recipient;

transmitting, by the computing device, the first gift selection matrix to a first user computing device for display via a first display of the first user computing device and to a second user computing device for display via the first gift selection matrix via a second display of the second user computing device;

receiving a first user item selection associated with the set of items included in the first gift selection matrix;

receiving a first pledge indicative of a first gift purchase contribution amount;

receiving a second user item selection associated with the set of items included in the first gift selection matrix;

receiving a second pledge indicative of a second gift purchase contribution amount;

determining, by the computing device, that a sum of the first pledge and the second pledge is insufficient to cover a cost of at least one of the first user item selection or the second user item selection;

causing, in response to receiving, the first user item selection, the second user item selection, the first pledge, and the second pledge, one or more items included in the first gift selection matrix to be omitted from a second gift selection matrix that is generated subsequent to the first gift selection matrix, wherein causing the one or more items to be omitted from the second gift selection matrix includes:

determining first metadata included in one or more cells of the first gift selection matrix that are associated with one or more unselected items of the set of items and that are non-contiguous to at least one of a first cell of the first gift selection matrix associated with the first user item selection or a second cell of the first gift selection matrix associated with the second user item selection; and in response to the first user item selection and the second user item selection, removing the first metadata from the one or more cells, thereby making the one or more cells available for second metadata associated with different items;

modifying, by the computing device and in response to receiving the first user item selection, the second user item selection, the first pledge, and the second pledge, the first gift selection matrix to generate the second gift selection matrix that omits the one or more items and that includes a second set of items including a first item associated with the first user item selection and a second item associated with the second user item selection, the second gift selection matrix including a first selectable option to adjust the first pledge and a second selectable option to adjust the second pledge;

transmitting the second gift selection matrix to the first user computing device for display via the first display of the first user computing device;

transmitting the second gift selection matrix to the second user computing device for display via the second display of the second user computing device; and receiving, in association with the second gift selection matrix, a final gift selection from the first user computing device and the second user computing device.

7. The method of claim 6, wherein responsive to receiving the second pledge for additional funds, determining whether the second pledge is sufficient to cover the cost of at least one of the first user item selection or the second user item selection; and initiating a purchase transaction responsive to receiving the second pledge that is sufficient to cover the cost of one of the first user item selection and the second user item selection.

8. The method of claim 7, wherein generating the first gift selection matrix comprises:

retrieving, from an item selection system, metadata associated with a plurality of items of interest to the recipient, the plurality of items of interest comprising a first item having a first item cost and a first item interest score;

retrieving, from the item selection system, a second item having a second item cost and a second item interest score;

retrieving, from the item selection system, a third item having a third item cost and a third item interest score;

creating an empty grid having a plurality of columns dividing a predetermined range of prices and a plurality of rows dividing a predetermined range of interest scores, wherein the predetermined range of interest scores are indicative of a predicted interest of a respective item to the recipient; and populating, using the metadata, the empty grid with the first item, the second item, and the third item based on the first item cost, the first item interest score, the second item cost, the second item interest score, the third item cost and the third item interest score.

9. The method of claim 8, wherein the item selection system determines the plurality of items of interest based on one or more of a browsing history, a search history, and a purchase history.

10. The method of claim 8, wherein generating the second gift selection matrix comprises:

identifying a cluster of items from the second gift selection matrix, the cluster of items comprising items proximate to the first user item selection and the second user item selection on the second gift selection matrix;

retrieving, from the item selection system, a second plurality of items based on the cluster of items;

creating a second empty grid having a plurality of columns associated with a second range of prices, the second range of prices having a maximum limit equal to the sum of the first pledge and the second pledge, and a plurality of rows associated with the predetermined range of interest scores; and populating the empty grid with the first item, the second item, the third item, and a fourth selected item of the second plurality of items, wherein the fourth selected item is based on the cluster of items.

11. The method of claim 10, wherein generating the second gift selection matrix further comprises:

receiving, via one or more of the first display of the first user computing device and the second display of the second user computing device, a selection of a custom item for adding to the second gift selection matrix;

retrieving, from the item selection system, an interest score and a cost for the custom item; and populating the empty grid with the custom item.

12. The method of claim 6, wherein responsive to determining that a sum of the first pledge and the second pledge is greater than the cost of an item selection, reducing the first pledge and the second pledge by a proportional amount equal to a difference between the sum of the first pledge and the second pledge and the cost of the item selection; and completing the purchase transaction.

13. A system comprising:

one or more processors; and memory to store computer-executable instructions that, when executed, cause the one or more processors to:

generate a first gift selection matrix comprising a set of items of interest to a recipient, the first gift selection matrix comprising columns of increasing cost and rows of decreasing interest to the recipient;

transmit the first gift selection matrix to a first user computing device for display via a first display of the first user computing device;

transmit the first gift selection matrix to a second user computing device for display-via a second display of the second user computing device;

receive a first user item selection associated with the set of items included in the first gift selection matrix;

receive a first pledge indicative of a first gift purchase contribution amount;

receive a second user item selection associated with the set of items included in the first gift selection matrix;

receive a second pledge indicative of a second gift purchase contribution amount;

determining, by the one or more processors, that a sum of the first pledge and the second pledge is insufficient to cover a cost of at least one of the first user item selection or the second user item selection;

causing, in response to receiving, the first user item selection, the second user item selection, the first pledge, and the second pledge, one or more items included in the first gift selection matrix to be omitted from a second gift selection matrix that is generated subsequent to the first gift selection matrix, wherein causing the one or more items to be omitted from the second gift selection matrix includes:

determining first metadata included in one or more cells of the first gift selection matrix that are associated with one or more unselected items of the set of items and that are non-contiguous to at least one of a first cell of the first gift selection matrix associated with the first user item selection or a second cell of the first gift selection matrix associated with the second user item selection; and in response to the first user item selection and the second user item selection, removing the first metadata from the one or more cells, thereby making the one or more cells available for second metadata associated with different items;

modifying, by the one or more processors and in response to receiving the first user item selection, the second user item selection, the first pledge, and the second pledge, the first gift selection matrix to generate the second gift selection matrix, the second gift selection matrix that omits the one or more items and that includes a second set of items including a first item associated with the first user item selection and a second item associated with the second user item selection, the second gift selection matrix including a first selectable option to adjust the first pledge and a second selectable option to adjust the second pledge; and initiate a purchase transaction responsive to determining that a new first user item selection received via the second gift selection matrix presented via the first display of the first user computing device is a same as a new second user item selection received via the second gift selection matrix presented via the second display of the second user computing device, and further responsive to determining that an increased first pledge and an increased second pledge is sufficient to purchase at least an item associated with at least one of the new first user item selection and the new second user item selection.

14. The system of claim 13, wherein at least one of the first user item selection and the second user item selection is a same item as one or more of the new first user item selection and the new second user item selection.

15. The system of claim 14, wherein generating the first gift selection matrix comprises:

retrieving, from an item selection system, metadata associated with a plurality of items of interest to the recipient, the plurality of items of interest comprising a first item having a first item cost and a first item interest score, a second item having a second item cost and a second item interest score, and a third item having a third item cost and a third item interest score;

creating an empty grid having a plurality of columns dividing a predetermined range of prices and a plurality of rows dividing a predetermined range of interest scores, wherein the predetermined range of interest scores are indicative of a predicted interest of a respective item to the recipient; and populating, using the metadata, the empty grid with the first item, the second item, and the third item based on the first item cost, the first item interest score, the second item cost, the second item interest score, the third item cost and the third item interest score.

16. The system of claim 15, wherein the item selection system determines the plurality of items of interest based on one or more of a browsing history, a search history, and a purchase history.

17. The system of claim 15, wherein modifying the first gift selection matrix to generate the second gift selection matrix comprises:

identifying a cluster of items from the first gift selection matrix, the cluster of items comprising items proximate to the first user item selection and the second user item selection on the first gift selection matrix;

retrieving, from the item selection system, a second plurality of items based on the cluster of items;

creating a second empty grid having a plurality of columns associated with a second range of prices, the second range of prices having a maximum limit equal to the sum of the first pledge and the second pledge, and a plurality of rows associated with the predetermined range of interest scores; and populating the empty grid with the first item, the second item, the third item, and a fourth selected item of the second plurality of items, wherein the fourth selected item is based on the cluster of items.

18. The system of claim 17, wherein modifying the first gift selection matrix to generate the second gift selection matrix further comprises:

receiving, via one or more of the first display of the first user computing device and the second display of the second user computing device, a selection of a custom item for adding to the second gift selection matrix;

retrieving, from the item selection system, an interest score and a cost for the custom item; and populating the empty grid with the custom item.

19. The system of claim 13, wherein responsive to determining that the sum of the first pledge and the second pledge is greater than the cost of an item selection, reducing the first pledge and the second pledge by a proportional amount equal to a difference between the sum of the first pledge and the second pledge and the cost of the item selection; and initiating completion of the purchase transaction.

20. The system of claim 19, wherein initiating completion of the purchase transaction comprises obtaining first user pledged funds and second user pledged funds, and completing the purchase transaction by transferring the first user pledged funds and the second user pledged funds to a common payment account.

* * * * *